UNITED STATES PATENT OFFICE.

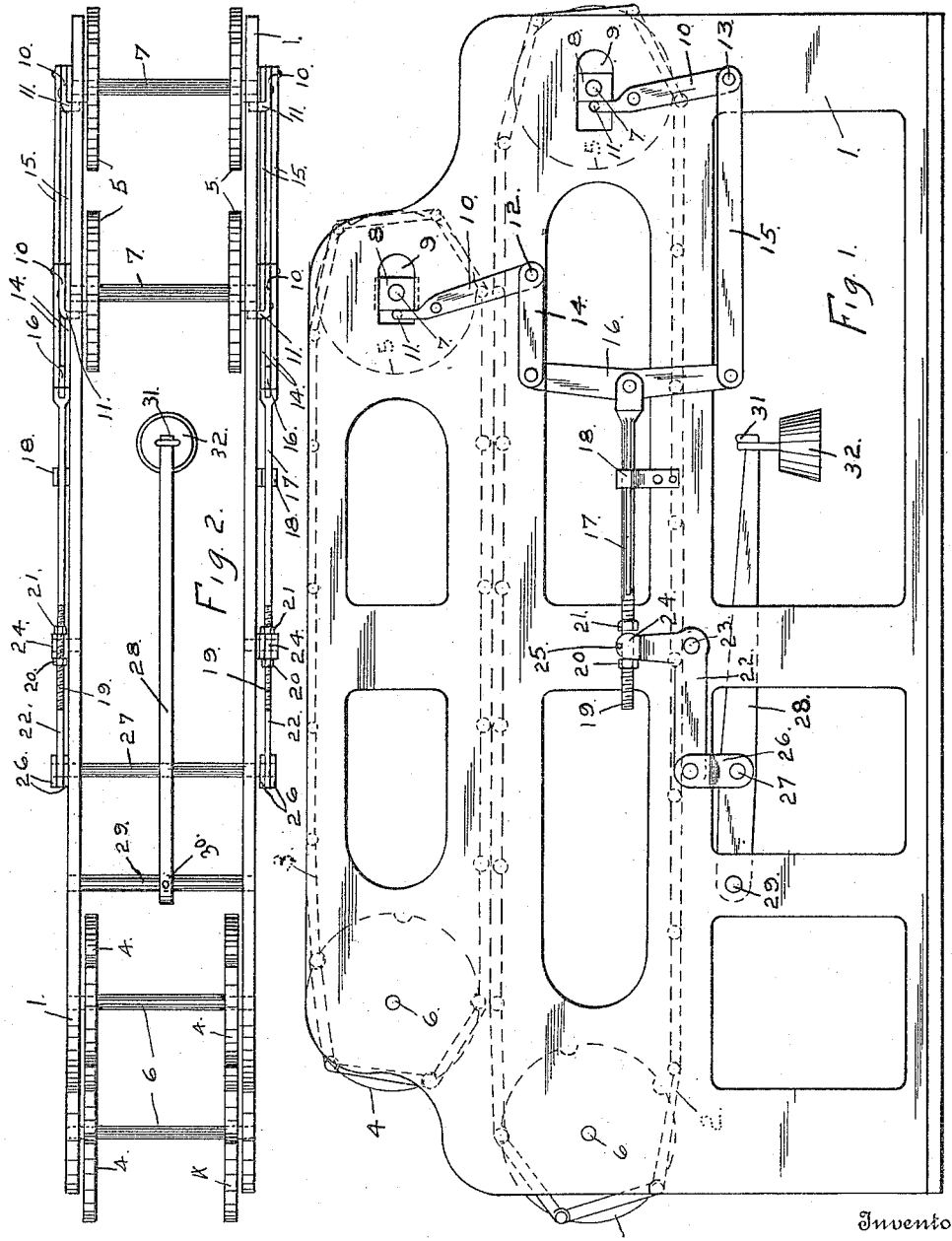

JAMES W. LAWHEAD, OF WILMINGTON, OHIO, ASSIGNOR TO THE TURNBULL MANUFACTURING COMPANY, OF WILMINGTON, OHIO, A CORPORATION OF OHIO.

AUTOMATIC TAKE-UP FOR CHAIN BAKING-MACHINES.

1,203,122. Specification of Letters Patent. Patented Oct. 31, 1916.

Application filed March 18, 1912. Serial No. 684,586.

*To all whom it may concern:*

Be it known that I, JAMES W. LAWHEAD, a citizen of the United States, residing at Wilmington, in the county of Clinton and State of Ohio, have invented certain new and useful Improvements in Automatic Take-Ups for Chain Baking-Machines, of which the following is a specification.

My invention relates to machines for baking continuously and is in the nature of an automatic take-up for chain baking machines.

It is particularly adapted for automatic compensation of comparative increases due to differences in expansion and contraction of the baking elements which are linked together in any desired manner.

The device is particularly applicable to a machine wherein there are utilized superposed baking plates disposed in the form of superposed endless chains continuously moving in a manner to successfully bring pairs of baking plates into coöperative relation. In application to a machine of this type, the take-up mechanism is preferably applied to movable bearings respectively provided for the chains and comprises leverage mechanism responsive to a yielding or tightening of either chain through comparatively sensitive response to movement of its adjustable bearing. This is desirably effected by a positive movement of the leverage mechanism by the movement of the movable bearing in one direction and by a tendency of the leverage mechanism to return toward a normal position by the movement of the movable bearing of one of the chains in an opposite direction. Thus the movable bearings, and consequently the chains, are at all times under the control of the leverage mechanism.

The preferred embodiment of my invention is shown in the accompanying drawings, in which similar characters of reference designate corresponding parts, and in which:

Figure 1 is a side elevation of a chain baking machine with my invention applied thereto, and Fig. 2 is a top plan view thereof.

In the drawings, the framework of my machine is designated 1 and I have shown in carrying superposed chain elements 2 and 3 operating over sprockets 4 and 5 and preferably constituted of a series of baking plates closely connected together in any desired manner into endless chains. The sprockets 4 and 5 are respectively mounted upon axles 6 and 7 and the axles 7 are supported in shiftable bearing blocks 8 mounted in slideways 9. Beneath and adjacent to each of said slideways 9 there is fulcrumed a lever 10 having its short arm 11 extending into contact with the inner side of a bearing 8 and having its long arm pivotally connected as at 12 and 13 to links 14 and 15. These links 14 and 15 are in turn pivotally connected to cross pieces 16 to which are also pivotally connected reach rods 17 at a point intermediate their ends and which are supported by brackets 18 and threaded at their outer extremities as at 19 for the reception of spaced nuts 20 and 21. Mounted beneath the extremities of these reach rods 17 are bell crank levers 22 which are pivoted as at 23 and which have their upper ends bifurcated as at 24 for the comparatively loose reception of the threaded extremities of the rods 17, such extremities being held within the said bifurcation by any suitable means such as cotter pins 25. Pivotally connected to the long or horizontal arms of the bell cranks 22 are links 26 which are in turn loosely joined by a transverse shaft 27 passing through a lever 28 fulcrumed upon a shaft 29 as at 30 and having its opposite end constructed as at 31 to support a weight 32.

In operation, it will be understood that the weight will at all times tend to draw the lever 28 downwardly and to consequently draw down upon the horizontal arms of the bell crank levers through the links 26. This downward pull will in turn be transmitted to the reach rods 17 and by them to the levers 10 through the cross pieces 16 and connecting links 14 and 15. This continual pulling action will cause the extensions 11 of the levers 10 to bear against the shiftable bearing blocks and serve to at all times tension the chains by forcing said bearing blocks in an outward direction. By pivoting the members 16 to the reach rods 17, it will be apparent that the bearing blocks of one of the chains may be shifted inwardly or outwardly without affecting the position of the bearing blocks of the other chain. For example, should one chain be subjected to a heat of greater intensity than the other, one of the chains will expand more rapidly than the other and to provide for conditions such as this, I have shown the cross pieces 16 as pivotally connected to links 14 and 15 and being pivotally connected to the reach rods 17 intermediate its ends. Under these conditions, should one chain expand more rapidly than the other, the link 14 or 15 moving the greater amount would slightly oscillate the cross pieces 16 about its opposing pivot point connection to the other link. The outward pressure, however, would at all times be the same, thus tensioning both chains to the proper degree and as the whole device becomes uniformly heated, as is intended, before the introduction of the batter, the two chains will be in their correct relative positions.

It will thus be seen that I have provided an automatic take-up responsive to all conditions that a baking machine may be subjected to and one in which the chains of baking plates are at all times under control and, when properly heated, will be coincident throughout.

What I claim, is—

1. A baking machine comprising superposed endless chains of baking plates, the lower strand of the upper chain registering with the upper strand of the lower chain, and means automatically effective for maintaining the registry of said plates by maintaining the tautness of said chains under varying degrees of applied heat, said means being constructed to permit lengthening of one chain without a corresponding increase in the other chain.

2. A baking machine comprising superposed endless chains of baking plates, the lower strand of the upper chain registering with the upper strand of the lower chain, and gravity actuated means automatically effective for maintaining the tautness of said chains under varying degrees of applied heat, said means being effective to permit lengthening of one chain without a corresponding increase in the other chain.

3. A baking machine comprising superposed endless chains of baking plates, the lower strand of the upper chain registering with the upper strand of the lower chain, and means automatically effective for maintaining the tautness of said chains under varying degrees of applied heat, said means being effective to permit lengthening of one chain entirely independent of any lengthening movement of the other chain.

4. A baking machine comprising superposed endless chains of baking plates, the lower strand of the upper chain registering with the upper strand of the lower chain, side frames between which said chains are disposed, a pair of movable bearings for each chain slidably mounted in said side frames, and means operating in connection with said bearings automatically effective for maintaining the tautness of said chains under varying degrees of applied heat, said means comprising a weight and lever system effective to permit lengthening of one chain without a corresponding increase in the other chain.

5. A baking machine comprising superposed endless chains of baking plates, side plates between which said chains are disposed, a pair of movable bearings for each chain slidably mounted in said side plates, a lever for each slidable bearing pivoted intermediate its ends and arranged to bear on its bearing, a link pivoted to the opposite end of each of said levers, a tie piece joining the ends of each pair of said links, a weight, and leverage means supporting said weight and operatively engaging said tie pieces.

In testimony whereof I affix my signature in presence of two witnesses.

JAMES W. LAWHEAD.

Witnesses:
WALTER E. L. BOCK,
A. L. PHELPS.

Copies of this patent may be obtained for five cents each, by addressing the "Commissioner of Patents, Washington, D. C."